(12) United States Patent
Chatwin et al.

(10) Patent No.: US 10,375,441 B2
(45) Date of Patent: Aug. 6, 2019

(54) LOCALLY GENERATED SPOT BEAM REPLACEMENT

(71) Applicant: DISH Network L.L.C., Englewood, CO (US)

(72) Inventors: Alistair Chatwin, Highlands Ranch, CO (US); William Michael Beals, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 26 days.

(21) Appl. No.: 15/857,262

(22) Filed: Dec. 28, 2017

(65) Prior Publication Data

US 2019/0208265 A1  Jul. 4, 2019

(51) Int. Cl.
| | |
|---|---|
| *H04N 5/445* | (2011.01) |
| *H04N 21/44* | (2011.01) |
| *H04N 21/61* | (2011.01) |
| *H04N 21/436* | (2011.01) |
| *H04N 21/438* | (2011.01) |
| *H04N 21/2343* | (2011.01) |
| *H04N 21/235* | (2011.01) |
| *H04N 21/4402* | (2011.01) |

(52) U.S. Cl.
CPC ... *H04N 21/44016* (2013.01); *H04N 21/2353* (2013.01); *H04N 21/234309* (2013.01); *H04N 21/4382* (2013.01); *H04N 21/43615* (2013.01); *H04N 21/440218* (2013.01); *H04N 21/6112* (2013.01); *H04N 21/6143* (2013.01)

(58) Field of Classification Search
CPC ..... H04N 21/44016; H04N 21/234309; H04N 21/2353; H04N 21/43615; H04N 21/4382; H04N 21/440218; H04N 21/6143
See application file for complete search history.

(56) References Cited

U.S. PATENT DOCUMENTS

| 8,832,743 | B2 * | 9/2014 | Kummer | .......... H04N 21/47217 |
| | | | | 725/47 |
| 9,148,693 | B1 * | 9/2015 | Jupin | ............... H04N 21/43615 |
| 2005/0251843 | A1 * | 11/2005 | Walker | .................. H04N 7/165 |
| | | | | 725/117 |

(Continued)

*Primary Examiner* — Pankaj Kumar
*Assistant Examiner* — Sahar Aqil Riaz
(74) *Attorney, Agent, or Firm* — Seed IP Law Group LLP

(57) ABSTRACT

Embodiments are directed toward locally generating a replacement spot beam signal to be combined with other orbital television signals, where the replacement spot beam signal is generated from locally received over-the-air television signals. Over-the-air television signals are received at a user's premises via an over-the-air antenna and orbital signals are received at the user's premises via a satellite antenna. The orbital signals include a spot beam signal and other orbital signals. The spot beam signal is specifically generated for the geographical area associated with the over-the-air television signals. One or more available local channels are extracted from the over-the-air television signals and are converted into the replacement spot beam signal that is a satellite-compatible signal. The replacement spot beam, instead of the original spot beam signal, is then combined with the other orbital signals and provided to a content receiver.

20 Claims, 6 Drawing Sheets

(56) References Cited

U.S. PATENT DOCUMENTS

| | | | |
|---|---|---|---|
| 2009/0144773 A1* | 6/2009 | Cavanaugh | H04N 5/44543 725/44 |
| 2009/0228930 A1* | 9/2009 | Luu | H04H 20/42 725/63 |
| 2013/0243397 A1* | 9/2013 | Minnick | H04N 5/782 386/291 |
| 2015/0230004 A1* | 8/2015 | VanDuyn | H04N 21/6334 725/27 |
| 2016/0119665 A1* | 4/2016 | Grant | H04N 21/2668 725/35 |
| 2016/0191145 A1* | 6/2016 | Fang | H04B 7/18513 370/316 |
| 2016/0316269 A1* | 10/2016 | Parker | H04N 21/4667 |
| 2017/0085328 A1* | 3/2017 | Dickemann, Jr. | H04H 20/02 |
| 2017/0238032 A1* | 8/2017 | Casavant | H04H 60/16 725/25 |
| 2017/0318353 A1* | 11/2017 | Petruzzelli | H04N 21/41 |

* cited by examiner

US 10,375,441 B2

LOCALLY GENERATED SPOT BEAM REPLACEMENT

TECHNICAL FIELD

The present disclosure relates generally to providing audiovisual content to a user, and more particularly to replacing a satellite spot beam signal with content received via local over-the-air television signals.

BACKGROUND

Description of the Related Art

Multi-dwelling units, such as hotels and apartment complexes, typically utilize a single satellite dish to receive satellite signals for a plurality of local and non-local channels of audiovisual content. These satellite signals typically include a spot beam signal that includes local channels for a particular geographical area. To generate the spot beam, the content distributor receives the local channels, generates the spot beam, and transmits the spot beam, along with other orbital signals, to a satellite for distribution to individual customers. However, the content distributor is often charged a fee by the local channels to retransmit the local channels via satellite, which fee can be relatively high relative compared to simply getting the local channels free over the air. It is with respect to these and other considerations that the embodiments described herein have been made.

BRIEF SUMMARY

Briefly described, embodiments are directed toward systems and methods of replacing a satellite spot beam signal with local over-the-air television signals to provide local programming content to one or more content receivers without relying on the original spot beam signal to provide the local programming content. One such benefit allows a content distributor to avoid or reduce retransmission of local programming content via satellite.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
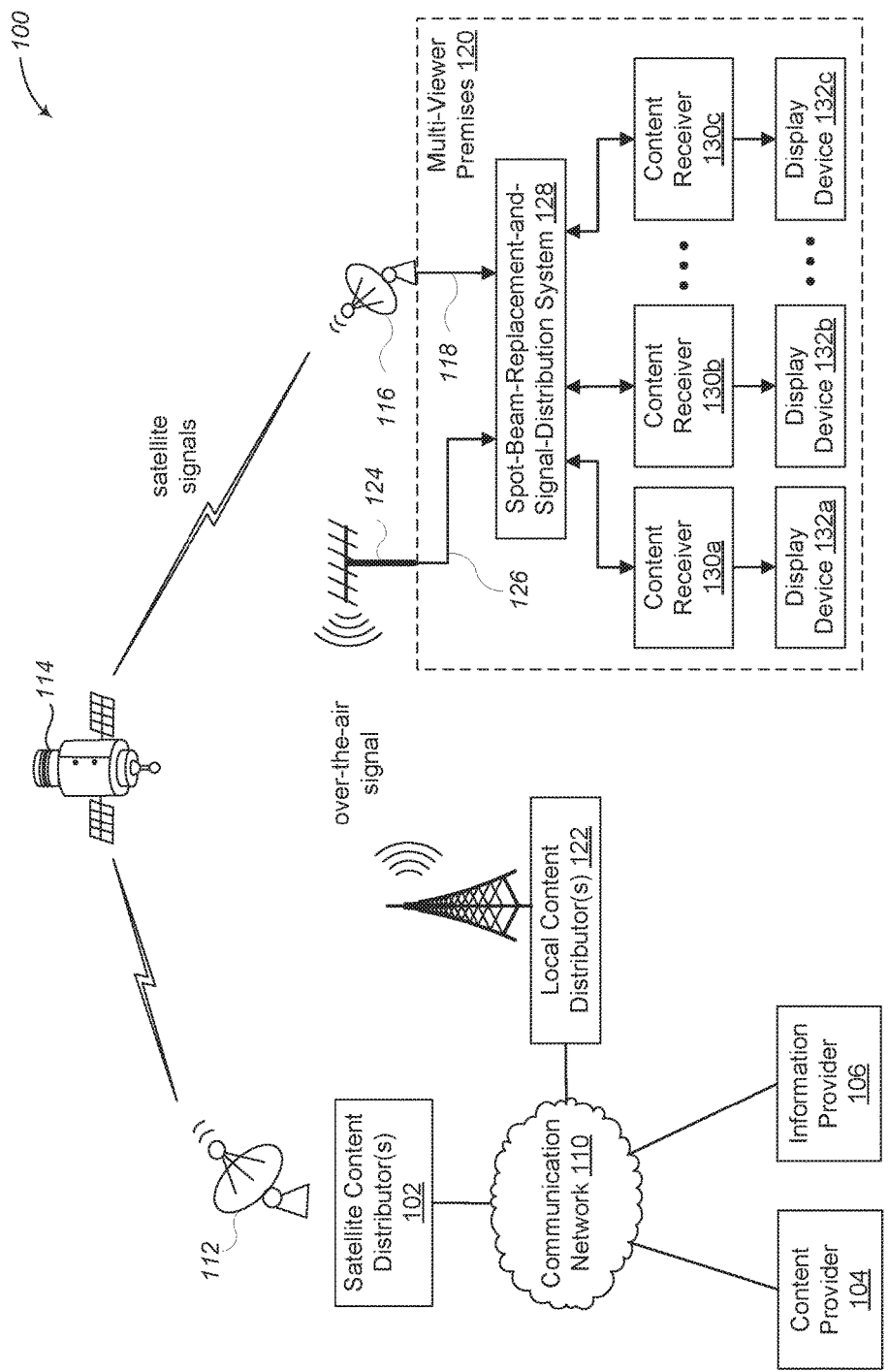
FIG. 1 illustrates a context diagram of an environment for providing content to viewers in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including, but not limited to, the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references.

References herein to the terms "orbital signal" or "orbital television signal" refer to satellite orbital television signals that include information or audiovisual content that are transmitted from a satellite to a satellite antenna. The orbital signals include a spot beam and one or more other orbital signals.

References herein to the terms "spot beam" and "spot beam signal" refer to an orbital signal that is generated for and transmitted to a specific geographical area. A spot beam signal includes information identifying the local channels that are expected to be broadcast via over-the-air television signals in the specific geographical area. The spot beam signal may also include other information, such as data tables that identify other characteristics or attributes of the other orbital television signals that accompany the spot beam signal.

References herein to the terms "other orbital signals" and "other orbital television signals" refer to one or more orbital signals that accompany the spot beam signal. The other orbital signals typically include audiovisual content for non-local channels or on-demand content.

FIG. 1 shows a context diagram of one embodiment of an environment 100 for providing content to viewers in accordance with embodiments described herein. Environment 100 includes multi-viewer premises 120, satellite content distributor(s) 102, and local content distributor(s) 122.

Multi-viewer premises 120 is a location that includes a plurality of content receivers 130a-130c. In various embodiments, the multi-viewer premises 120 is separated into a plurality of living units that each includes one or more content receivers 130a-130c. Examples of multi-viewer premises 120 include, but are not limited to, hotels, apartment buildings, dormitories, multiplex residential buildings, or even single family homes that have a plurality of content receivers. Since some people living in the multi-viewer premises 120 may not subscribe to receiving satellite television content, there may be some situations where not every living unit in the multi-viewer premises 120 includes a content receiver 130, but the multi-viewer premises 120 is wired for multiple content receivers.

In some situations, each unit in the multi-viewer premises 120 that wants to receive television channels may have a separate satellite antenna and over-the-air antenna. However, the multi-viewer premises 120 may not have sufficient structural locations in which to mount numerous satellite or over-the-air antennas. Similarly, the cabling between the antennas and the content receivers for each unit can become increasingly expensive.

So rather than having each content receiver 130 or each unit in the multi-viewer premises 120 have a satellite antenna and an over-the-air antenna, the multi-viewer premises 120 includes one over-the-air antenna 124 and one satellite antenna 116 to receive television content and distribute among the plurality of content receivers 130a-130c. The over-the-air antenna 124 receives one or more local over-the-air television signals from the local content distributor 122, and the satellite antenna 116 receives a plurality of orbital signals from the satellite content distributor 102 via satellite 114 and uplink antenna 112. In some embodiments, satellite antenna 116 includes a plurality of satellite antennas, with one of the satellite antennas receiving a spot beam signal and the other satellite antennas receiving other orbital signals. In other embodiments, over-the-air antenna 124 includes a plurality of over-the-air antennas.

Orbital signals received via the satellite antenna 116 are provided to spot-beam-replacement-and-signal-distribution system 128 via communication link 118. And over-the-air signals received via the over-the-air antenna 124 are provided to the spot-beam-replacement-and-signal-distribution system 128 via communication link 126. The spot-beam-replacement-and-signal-distribution system 128 generates a replacement spot beam for the orbital signals received via the satellite antenna 116 with content from the over-the-air signals received via the over-the-air antenna 124. The spot-beam-replacement-and-signal-distribution system 128 then distributes the replacement spot beam and other orbital signals to the plurality of content receivers 130a-130c.

The content receivers 130a-130c are computing devices that receive satellite signals from the spot-beam-replacement-and-signal-distribution system 128 and extract audiovisual content therefrom for presentation on respective display devices 132a-132c. Examples of content receivers 130a-130c include, but are not limited to, a set-top box, a cable connection box, a computer, television receiver, radio receiver, or other content receivers. The display devices 132a-132c may be any kind of visual content display device, such as, but not limited to, a television, monitor, projector, or other display device. Although not illustrated, content receivers 130a-130c may also provide audio content to separate audio output devices.

Although FIG. 1 illustrates the content receivers 130 as providing content for display on display devices 132a-132c located on the multi-viewer premises 120, embodiments are not so limited. In some embodiments, the content receivers 130a-130c provide the content to a viewer's mobile device (not illustrated), such as a smartphone, tablet, or other computing device, that is at a remote location to the multi-viewer premises 120.

As mentioned above, the multi-viewer premises 120 receives over-the-air signals from the local content distributor 122 and orbital signals from the satellite content distributor 102. The local content distributor 122 transmits over-the-air signals with local television programming for location-specific television channels. Examples of local television programming channels include, but are not limited to, ABC, CBS, NBC, FOX, PBS and CW. The satellite content distributor 102 transmits other orbital signals with programming content for other, non-local channels and content. For example, the other orbital signals may include on-demand content, premium channel content (e.g., HBO, Showtime, NFL Network, etc.), or other subscription-based channels (e.g., TBS, ESPN, HGTV, etc.).

The satellite content distributor 102 and the local content distributor 122 receive the programming content to distribute from one or more content providers 104, one or more information providers 106, or a combination thereof. Typically, content providers 104 generate, aggregate, and/or otherwise provide audiovisual content, which may include movies, sitcoms, reality shows, talk shows, game shows, documentaries, infomercials, news programs, sports broadcasts, commercials, advertisements, or the like. Information provider 106 may create and distribute data or other information that describes or supports audiovisual content, such as program name, closed caption authoring, and placement within the content, time slot data, pay per view and related data, or other information that is associated with the content.

In various embodiments, content providers 104, information provider 106, satellite content distributor 102, and local content distributor 122 communicate with each other via communication network 110. Communication network 110 may be configured to couple various computing devices to transmit content/data from one or more computing devices to one or more other computing devices. For example, communication network 110 may be the Internet, X.25 networks, or a series of smaller or private connected networks that carry the content and other data. Communication network 110 may include one or more wired or wireless networks.

In some embodiments, the satellite content distributor 102 may provide additional information in the spot beam signal to aid the spot-beam-replacement-and-signal-distribution system 128 in generating the replacement spot beam. For example, in some embodiments, the satellite content distributor 102 includes an over-the-air antenna (not shown) that captures over-the-air signals from the local content distributor 122. The satellite content distributor 102 extracts the local content from the over-the-air signals and transcodes or otherwise encodes the local content into a video signal compatible with the content receiver 130. For example, in one embodiment, the extracted content is transcoded into an MPEG-4 video signal, which compresses the local content for distribution over the satellite 114.

Rather than modulate the transcoded signal into the spot beam, the satellite content distributor 102 generates a spot beam to include metadata identifying how the local content was transcoded by the satellite content distributor 102. This metadata may be referred to as transcoding metadata or encoding metadata and is the information that defines how the content was compressed from its original format into a new format. For example, in some embodiments, the transcoding metadata includes information identifying how group of pictures are generated, where anchor frames are located, distance between two full images, or other types of hinting information.

When the spot-beam-replacement-and-signal-distribution system 128 receives the over-the-air signals from the local content distributor 122, it buffers the received content until the transcoding metadata in the spot beam signal is received from the satellite content distributor 102. The spot-beam-replacement-and-signal-distribution system 128 then utilizes the transcoding metadata from the spot beam signal to transcode the received local content, which is then used to generate the replacement spot beam signal.

Since the satellite content distributor 102 typically has more computing power than the spot-beam-replacement-and-signal-distribution system 128, it can more efficiently compress and transcoded the original content then the spot-beam-replacement-and-signal-distribution system 128. Accordingly, the spot-beam-replacement-and-signal-distribution system 128 can save computing resources by not trying to figure out how to transcode the received local content and can just apply the transcoding metadata that was received in the spot beam signal. As a result, embodiments described herein provide the benefits of the satellite content distributor 102 not re-transmitting the local content via the satellite 114 and the spot-beam-replacement-and-signal-distribution system 128 transcoding the locally received content just as performed by the satellite content distributor 102.

In some other embodiments, the satellite content distributor 102 can modulate the transcoded signal into the spot beam along with the transcoding metadata. In this way, a content receiver—whether it receives the spot beam signal from the satellite 114 without the spot-beam-replacement-and-signal-distribution system 128 or receives the replacement spot beam signal from the spot-beam-replacement-and-signal-distribution system 128—can re-transcode the local content in the spot beam signal or in the replacement spot beam signal based on the transcoding metadata from the spot beam signal for sending to another computing device, such as a user's smart phone (not illustrated).

Figure 2:
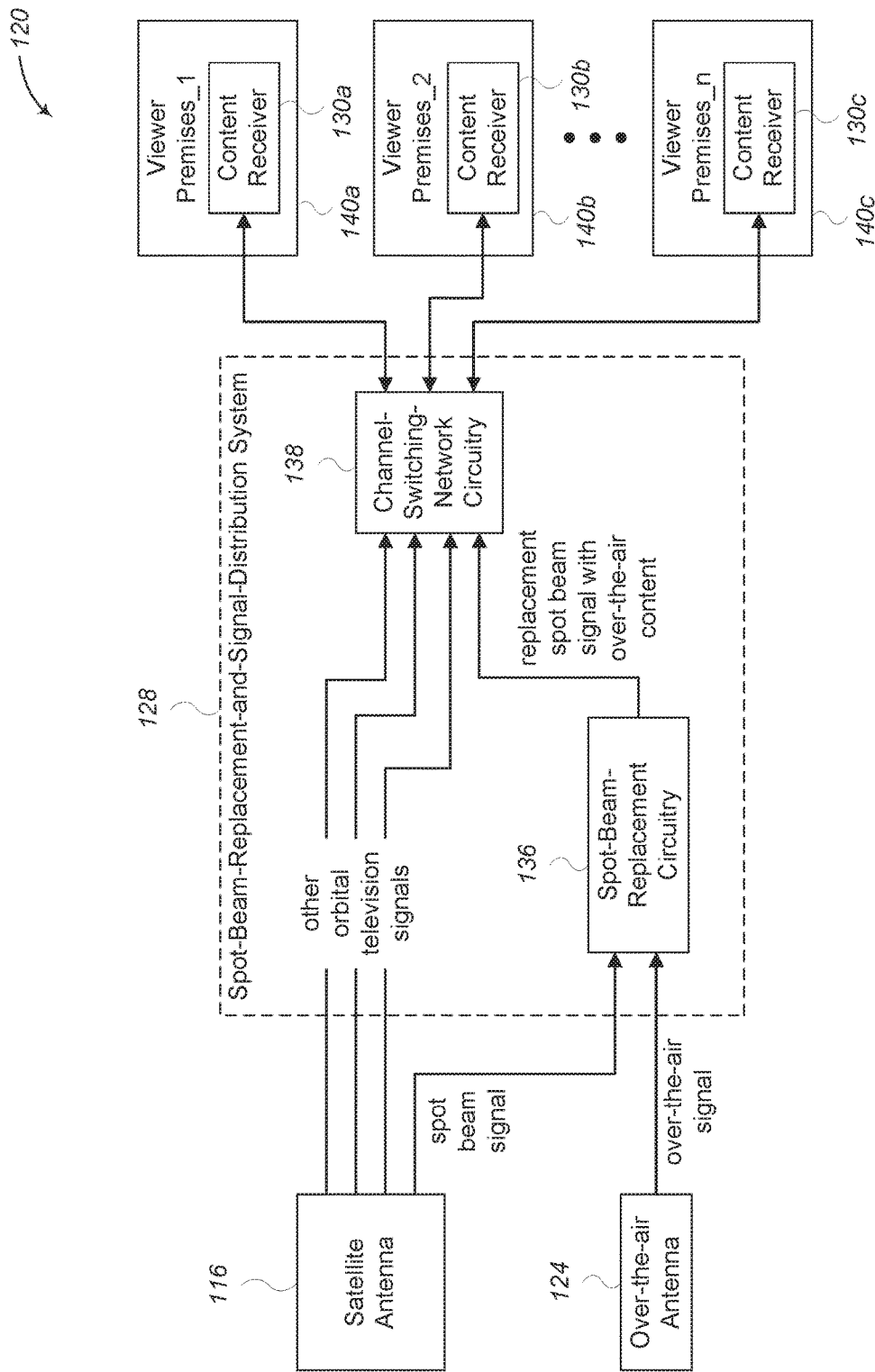
FIG. 2 is a context diagram of one non-limiting embodiment of premises having a spot-beam-replacement-and-signal-distribution system for presenting content to the viewers in accordance with embodiments described herein.

FIG. 2 is a context diagram of one non-limiting embodiment of a multi-viewer premises 120 having a spot-beam-replacement-and signal distribution system for presenting content to the viewers in accordance with embodiments described herein. As mentioned above, the multi-viewer premises 120 includes a satellite antenna 116, an over-the-air antenna 124, a spot-beam-replacement-and-signal-distribution system 128, and a plurality of content receivers 130a-130c. In this illustrated example, each content receiver 130a-130c is located at a separate viewer premises 140a-140c, respectively, on the multi-viewer premises 120.

The spot-beam-replacement-and-signal-distribution system 128 includes spot-beam-replacement circuitry 136 and channel-switching-network circuitry 138. The spot-beam-replacement circuitry 136 receives a spot beam signal from the satellite antenna 116 and one or more over-the-air signals 124 from the over-the-air antenna 124.

The spot-beam-replacement circuitry 136 generates a replacement spot beam signal by converting the over-the-air television signals into a satellite-compliant signal, which is described in more detail below in conjunction with FIG. 4. Briefly, however, the spot-beam-replacement circuitry 136 analyzes the spot beam data to determine one or more local channels that are expected to be included in the spot beam signal.

The spot-beam-replacement circuitry 136 analyzes the received over-the-air signals to determine which of the expected local channels are available in the over-the-air signals. The spot-beam-replacement circuitry 136 extracts the available channels from the over-the-air signals and transcodes or otherwise encodes them into a signal compatible with the content receivers 130a-130c. The spot-beam-replacement circuitry 136 then modulates the transcoded signal with one or more spot beam modulation parameters and up-converts the modulated signal to the transponder frequency of the original spot beam signal.

The replacement spot beam signal is provided to the channel-switching-network circuitry 138. The channel-switching-network circuitry 138 also receives one or more other orbital signals from the satellite antenna 116. The channel-switching-network circuitry 138 combines the replacement spot beam signal with the one or more other orbital signals for distribution to the content receivers 130a-130c. In some embodiments, the content receivers 130a-130c communicate with the channel-switching-network circuitry 138 to request specific channels in the replacement spot beam or in the other orbital signals. The channel-switching-network circuitry 138 selects the orbital signal or replacement spot beam signal associated with the requested channel and provides that signal to the requesting content receiver.

As mentioned above, the spot beam signal is a specific orbital signal to provide local programming content for a particular geographic area. In some embodiments, the spot beam signal includes the audiovisual content for the local channels. And in other embodiments, the spot beam signal does not include the audiovisual content for the local channels.

In embodiments where the spot beam signal includes the local programming content, over-the-air broadcasts of local channels in a geographic area are initially received and converted into the spot beam signal, along with the information identifying the local channels, prior to the spot beam signal being uplinked to the satellite for distribution to that same geographic area. When the spot-beam-replacement circuitry 136 receives the spot beam signal, it ignores or otherwise does not obtain the local programming content from the spot beam signal. Rather, it obtains the local content via the over-the-air signals and generates a replacement spot beam signal, as described herein. Inclusion of the local programming content in the spot beam allows other content receivers (not illustrated) that do not receive a replacement spot beam signal from a spot-beam-replacement-and-signal-distribution system 128, or do not themselves include the spot-beam-replacement circuitry 136, to still receive the local programming content via the spot beam signal.

In embodiments where the spot beam signal includes the local programming content, the spot beam signal is generated with information that identifies the local channels prior to being uplinked to the satellite, but it does not include the local content itself. Accordingly, other content receivers that do not receive a replacement spot beam signal from a spot-beam-replacement-and-signal-distribution system 128, or do not themselves include the spot-beam-replacement circuitry 136, do not receive the local programming content via the spot beam signal.

The operation of certain aspects will now be described with respect to FIGS. 3 and 4. In at least one of various embodiments, processes 150 and 180 described in conjunction with FIGS. 3 and 4, respectively, may be implemented by or executed via circuitry or on one or more computing devices, such as spot-beam-replacement-and-signal-distribution system 128 in FIG. 1.

Figure 3:
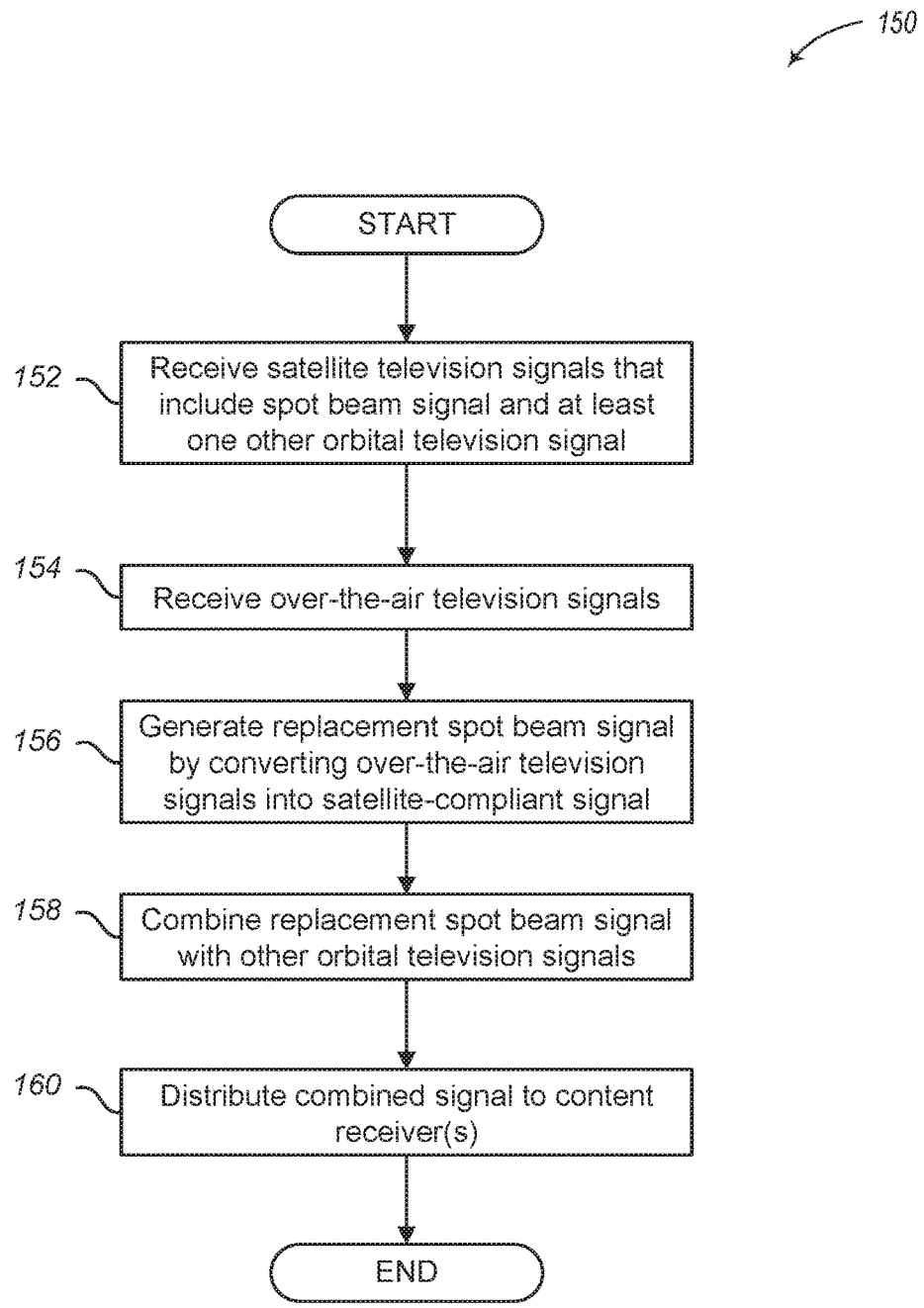
FIG. 3 illustrates a logical flow diagram showing one embodiment of an overview process for replacing an orbital television spot beam signal with content from locally received over-the-air television signals in accordance with embodiments described herein.

FIG. 3 illustrates a logical flow diagram showing one embodiment of an overview process for replacing an orbital television spot beam signal with content from locally received over-the-air television signals in accordance with embodiments described herein. Process 150 begins, after a start block, at block 152, where a plurality of satellite television signals are received. The plurality of satellite television signals includes a spot beam signal and one or more other orbital television signals. As described above, the spot beam signal is an orbital television signal that is generated for and transmitted to a specific geographical area. In embodiments described herein, the spot beam signal includes information identifying the channels that are expected to be local to the location where the plurality of satellite television signals is received. And as mentioned above, in some embodiments, the spot beam signal includes the local programming content, and in other embodiments, the spot beam signal does not include the local programming content itself.

Process 150 proceeds to block 154, where one or more over-the-air television signals are received. The over-the-air television signals include local programming content for one or more local channels.

Process 150 continues at block 156, where a replacement spot beam signal is generated, which is described in more detail below in conjunction with FIG. 4. Briefly, however, the replacement spot beam signal is generated by converting the over-the-air television signals into a satellite-compliant signal.

Process 150 proceeds next to block 158, where the replacement spot beam signal is combined with the other orbital television signals. In some embodiments, the combining of the replacement spot beam signal with the other orbital signals includes mixing the signal into a single signal. In other embodiments, the combining of the replacement spot beam signal with the other orbital signals includes providing each signal into a switching network for distribution.

Process 500 continues next to block 160, where the combined signal is distributed to one or more content receivers. In some embodiments, the entire combined signal is provided to the content receivers. In other embodiments, a specific signal is selected from the replacement spot beam signal and the other orbital signals to provide to a specific content receiver. In at least one such embodiment, the content receiver may request a specific channel, and the signal associated with the requested channel is provided to the content receiver.

After block 160, process 150 terminates or returns to a calling process to perform other actions.

Figure 4:
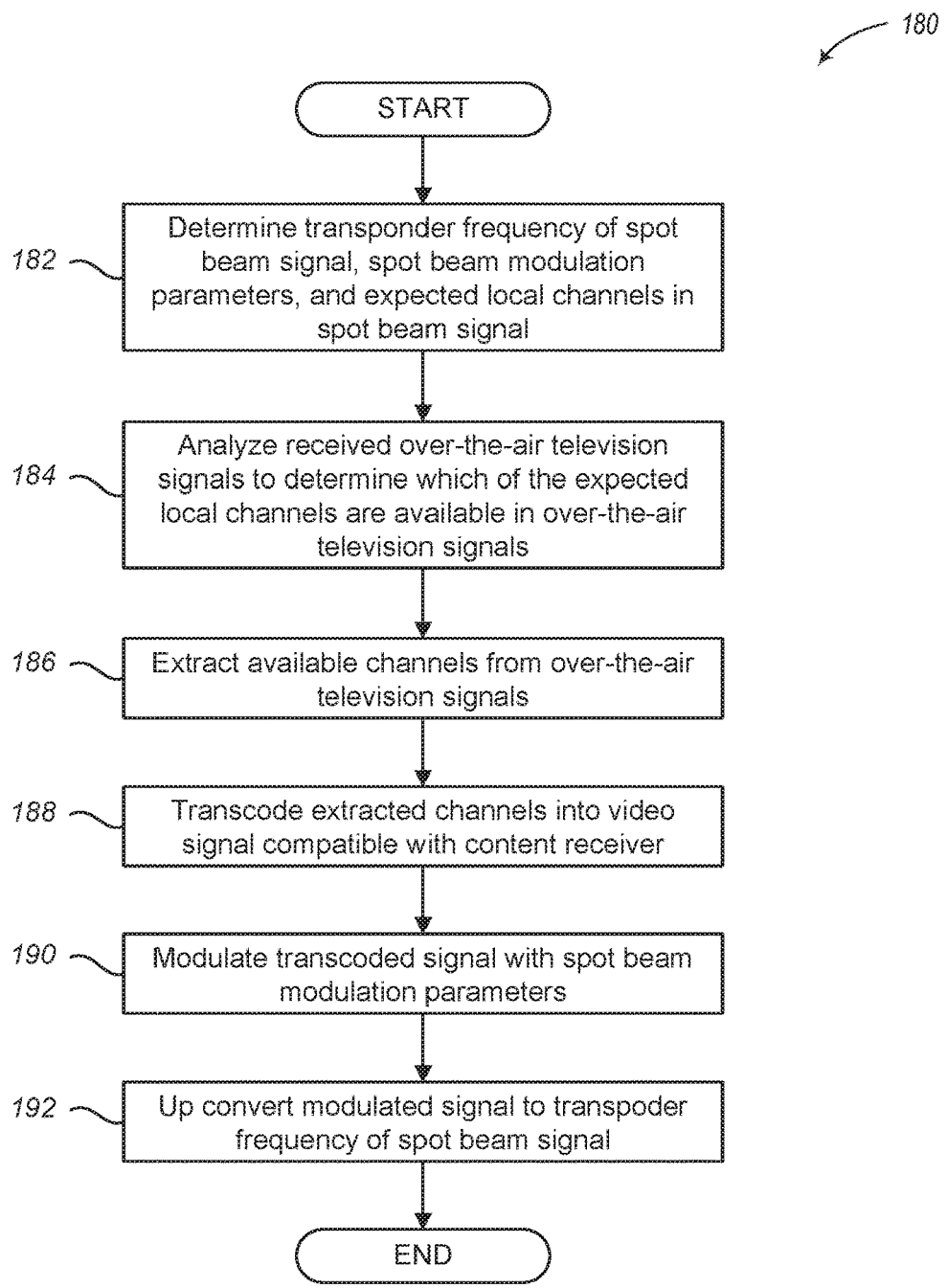
FIG. 4 illustrates a logical flow diagram of one embodiment of a process for converting the over-the-air television signals into a replacement spot beam in accordance with embodiments described herein.

FIG. 4 illustrates a logical flow diagram of one embodiment of a process for converting the over-the-air television signals into a replacement spot beam in accordance with embodiments described herein. Process 180 begins, after a start block, at block 182, where a plurality of characteristics of the spot beam signal are determined. These spot beam signal characteristics include a transponder frequency of the spot beam signal, one or more spot beam modulation parameters, and information regarding one or more expected local channels.

The transponder frequency is the frequency of the originally received spot beam signal by the satellite antenna. In some embodiments, the transponder frequency is input by a user or an administrator. In other embodiments, the spot beam signal is analyzed to determine its transponder frequency. The modulation parameters define various parameters of how the spot beam signal was modulated prior to being transmitted by the satellite.

The information regarding the one or more expected local channels identifies those channels that are expected to be received by an over-the-air television antenna in the geographical area associated with the spot beam signal. In various embodiments described herein, this local channel information does not include the actual programming content of the local channels, but rather information that identifies which local channels may be received in the geographic area. For example, the spot beam signal may include the channel numbers or associated frequencies for the local channels, location information of the expected geographical area of the local channel broadcasts (e.g., zip codes that should receive over-the-air transmissions of the local channels), or other information. In various embodiments, the spot beam signal is analyzed for the expected local channel identification. In some other embodiments, the spot beam signal may not include information regarding the expected local channels—rather, this information may be input by a user or administrator, such as via a graphical user interface.

Process 180 proceeds to block 184, where the received over-the-air television signals are analyzed to determine which of the expected local channels are available in the over-the-air television signals. Since the location and positioning of the over-the-air television antenna can reduce the quality of over-the-air signals it receives, it is possible for the received over-the-air signals to be of too poor quality to be displayed or not include all local channels that are being broadcast over the air in that particular geographic area. For example, assume the spot beam signal indicates that channels 2-7 should be available via over-the-air transmission in the geographic area associated with that spot beam signal. However, due to the positioning of the over-the-air antenna, maybe only channels 2 and 5 are present or of sufficiently good quality in the received over-the-air television signals. In this example, only channels 2 and 5 are available local over-the-air channels.

In some embodiments, the received over-the-air channels may include additional channels that were not identified by the spot beam signal. In at least one such embodiment, at least one channel from the one or more local channels that are available in the at least one over-the-air television signal is selected based on the information in the spot beam signal identifying the one or more expected local channels.

Process 180 continues at block 186, where the available local channels are extracted from the received over-the-air television signals. In various embodiments, extracting the available local channels includes performing over-the-air demodulation on the received over-the-air signals to obtain the programming content of those channels.

Process 180 proceeds next to block 188, where the extracted channels are transcoded or encoded into a video signal compatible with the content receiver. For example, in one embodiment, the extracted channels are transcoded into an MPEG-4 video signal compatible with the content receiver being used. In various embodiments, the local signals are transcoded so that they can be transmitted simultaneously within the bandwidth limit of the modulation parameters of the originally received spot beam signal. In some embodiments, an administrator can utilize a configuration port or other interface to check the quality of the transcoded signal to determine if the transcoded signal has been degraded.

Process 180 continues next at block 190, where the transcoded signal is modulated with the spot beam parameters determined at block 182.

Process 180 proceeds to block 192, where the modulated signal is up-converted to the transponder frequency of the spot beam signal determined at block 182.

After block 192, process 180 terminates or otherwise returns to a calling process to perform additional actions.

Figure 5A:
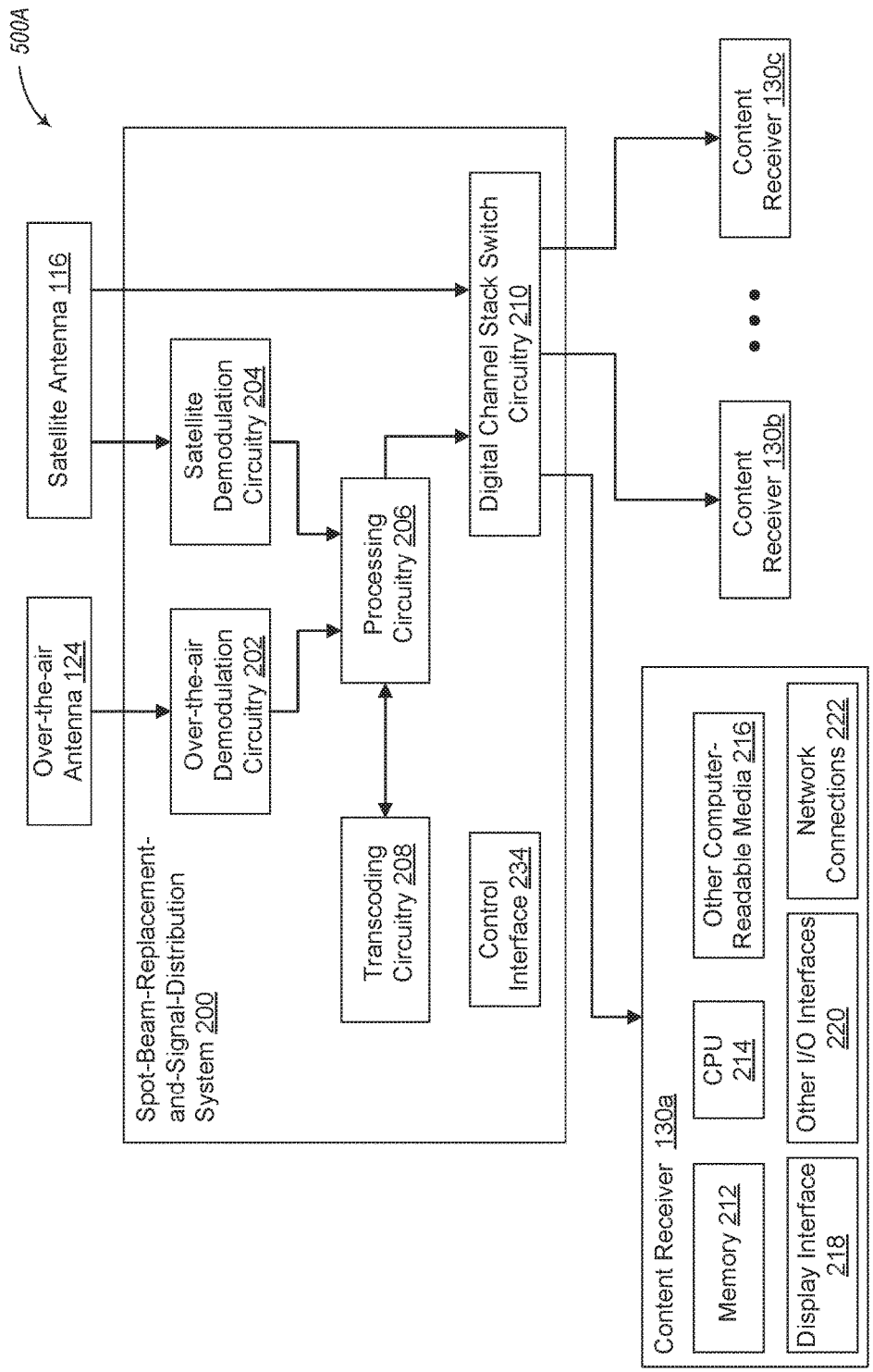
FIGS. 5A and 5B show system diagrams that describe various implementations of circuitry and computing systems for implementing embodiments described herein.
Figure 5B:
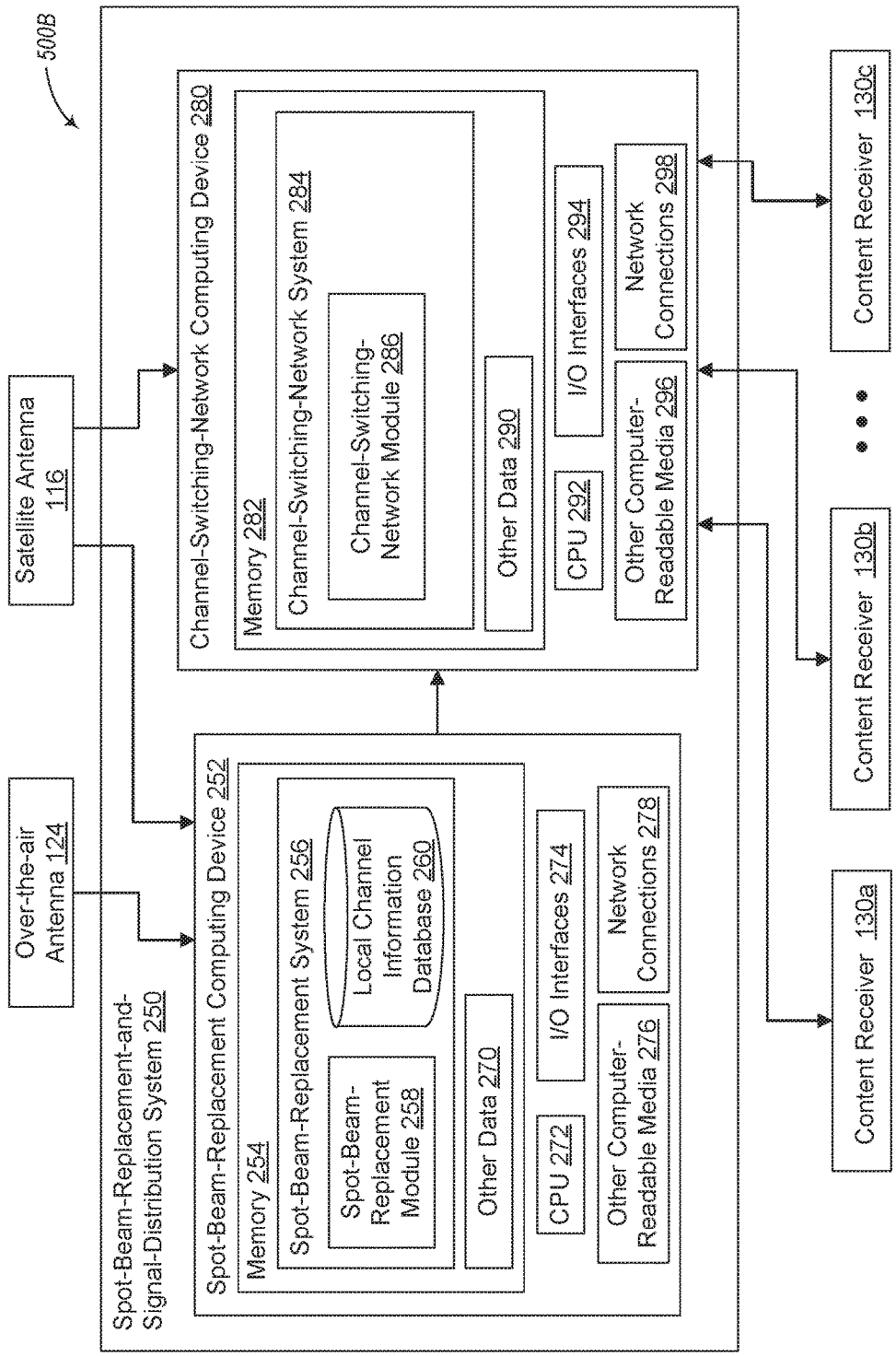

FIGS. 5A and 5B show system diagrams that describe various implementations of circuitry and computing systems for implementing embodiments described herein. System 500A in FIG. 5A includes spot-beam-replacement-and-signal-distribution system 200 and a plurality of content receivers 130a-130c. The spot-beam-replacement-and-signal-distribution system 200 is an embodiment of the spot-beam-replacement-and-signal-distribution system 128 in FIG. 1 and performs similar functionality.

The spot-beam-replacement-and-signal-distribution system 200 includes various different circuitries to perform embodiments described herein. However, other circuitry or combinations of circuitry may also be utilized to perform embodiments described herein. For example, the spot-beam-replacement-and-signal-distribution system 200 includes over-the-air demodulation circuitry 202, satellite demodulation circuitry 204, processing circuitry 206, transcoding circuitry 208, digital channel stack switch circuitry 210, and control interface 234, each of which may be implemented in software, hardware, firmware, or in some combination thereof.

The over-the-air demodulation circuitry 202 performs the demodulation of one or more over-the-air television signals received via over-the-air antenna 124. The satellite demodulation circuitry 204 performs the demodulation of the spot beam received via satellite antenna 116.

The processing circuitry 206 receives the demodulated over-the-air signals from the over-the-air demodulation circuitry 202 and the demodulated spot beam signal from the satellite demodulation circuitry 204. The processing circuitry 206 analyzes the spot beam signal to detect information regarding expected local channels in the geographic area associated with the location of the over-the-air antenna 124. The processing circuitry 206 also determines which channels are available at the over-the-air antenna 124 based on the channels received from the over-the-air demodulation circuitry 202. The processing circuitry 206 extracts available over-the-air channels based on the information received from the spot beam signal and provides the extracted channels to the transcoding circuitry 208. The processing circuitry 206 receives the transcoded signals from the transcoding circuitry 208, modulates them with the same parameters as the spot beam that was received via the satellite antenna 116, and up-converts the modulated signal to the appropriate transponder frequency of the spot beam to generate the replacement spot beam. The processing circuitry then provides the replacement spot beam to the digital channel stack switch circuitry 210.

The transcoding circuitry 208 transcodes the over-the-air signals into a video signal format, such as MPEG-4, compatible with the content receivers 130a-130c. In some embodiments, the content receivers 130a-130c may utilize different video signal formats, and the transcoding circuitry 208 can transcode the over-the-air signals based on the content receivers that requested content from an over-the-air channel and the video signal formats compatible with that content receiver.

The digital channel stack switch circuitry 210 mixes or combines the replacement spot beam received from the processing circuitry 206 with the other orbital signals received from the satellite antenna 116. In various embodiments, the digital channel stack switch circuitry 210 distributes the mixed signals to the content receivers 130a-130c. In some embodiments, the content receivers 130a-130c communicate with the digital channel stack switch circuitry 210 to select a channel, and the digital channel stack switch circuitry 210 provides the replacement spot beam or the orbital signal that includes the selected channel.

In some embodiments, processing circuitry 206 communicates and interacts with the control interface 234 to provide a user interface for a technician or administrator. In some embodiments, the control interface 234 enables the technician to see which over-the-air channels are received via the over-the-air antenna 124 and which over-the-air channels should be available based on the information from the spot-beam signal received via the satellite antenna 116. In at least one embodiment, the control interface 234 presents to the technician a simple table of the services that match the local channels that should be available or alternatives based on the information in the received spot beam, and the technician can select which over-the-air channels to include in a replacement spot-beam. In other embodiments, the control interface 234 enables the technician to check the quality of the transcoded signal generated by the transcoding circuitry 208 to make sure that the signal is not degraded.

The content receivers 130a-130c are special-purpose computing systems that receive audiovisual signals from the spot-beam-replacement-and-signal-distribution system 200 for presentation on a display device to a user. Accordingly, the content receivers 130a-130c may be implemented in software, hardware, firmware, or in some combination thereof. For ease of discussion, only example components of the content receiver 130a will be discussed. However, content receivers 130b and 130c may include similar or different components that perform similar functionality.

Content receiver 130a includes memory 212, one or more central processing units (CPUs) 214, other computer-readable media 216, display interface 218, other I/O interfaces 220, and network connections 222.

Memory 212 includes one or more various types of non-volatile and/or volatile storage technologies. Examples of memory 212 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 212 may be utilized to store information, including computer-readable instructions that are utilized by CPU 214 to perform actions as described herein.

Memory 212 may have stored thereon various different types of data or programs. For example, memory 212 may include a digital video recorder for storing received audiovisual content, or it may include programs for use by a user.

Network connections 222 are configured to communicate with other computing devices, such as spot-beam-replacement-and-signal-distribution system 200. Other I/O interfaces 220 may include a keyboard, audio interfaces, other video interfaces, or the like. Other computer-readable media 216 may include other types of stationary or removable computer-readable media, such as removable flash drives, external hard drives, or the like. Display interface 218 is configured to provide content to a display device, such as display device 132 (not shown in this figure, but illustrated in FIG. 1).

System 500A in FIG. 5A discussed above includes a spot-beam-replacement-and-signal-distribution system 200 that includes various different circuitry components. In other embodiments, the functionality of the spot-beam-replacement-and-signal-distribution system may be performed by one or more computing devices, such as illustrated in FIG. 5B.

System 500B in FIG. 5B illustrates a spot-beam-replacement-and-signal-distribution system 250 and a plurality of content receivers 130a-130c. The spot-beam-replacement-and-signal-distribution system 250 is an embodiment of the spot-beam-replacement-and-signal-distribution system 128 in FIG. 1, and performs similar functionality. The spot-beam-replacement-and-signal-distribution system 250 includes a spot-beam-replacement computing device 252 and a channel-switching-network computing device 280. In one non-limiting example, the spot-beam-replacement computing device 252 performs the functionality of spot-beam-replacement circuitry 136 in FIG. 2, and the channel-switching-network computing device 280 performs the functionality of channel-switching-network circuitry 138 in FIG. 2.

The spot-beam-replacement computing device 252 receives over-the-air television signals via over-the-air antenna 124 and a spot-beam signal from satellite antenna 116. In general, the spot-beam-replacement computing device 252 converts the over-the-air signals into satellite compatible signals as a replacement spot-beam signal and provides the replacement spot-beam signal to the channel-switching-network computing device 280. One or more special-purpose computing systems may be used to implement the spot-beam-replacement computing device 252. Accordingly, various embodiments described herein may be implemented in software, hardware, firmware, or in some combination thereof.

The spot-beam-replacement computing device 252 includes memory 254, one or more central processing units (CPUs) 272, other computer-readable media 276, I/O interfaces 274, and network connections 278.

Memory 254 includes one or more various types of non-volatile and/or volatile storage technologies, such as described above in conjunction with memory 212 in FIG. 5A. Memory 254 may be utilized to store information, including computer-readable instructions that are utilized by CPU 272 to perform actions as described herein.

Memory 254 may have stored thereon spot-beam-replacement system 256, which includes spot-beam-replacement module 258 and local channel information database 260. The spot-beam-replacement module 258 may employ embodiments described herein to generate a replacement spot beam signal from over-the-air signals received via the over-the-air antenna 124 based on information in the original spot beam signal received via the satellite antenna 116. In various embodiments, the spot-beam-replacement module 258 performs the functionality of the over-the-air demodulation circuitry 202, the satellite demodulation circuitry 204, the processing circuitry 206, the transcoding circuitry 208, and the control interface 234 in FIG. 5A. The local channel information database 260 stores various information regarding local channels that are available at the spot-beam-replacement-and-signal-distribution system 250, such as which over-the-air channels are available at the over-the-air antenna 124 and which channels should be available as provided by information in the spot beam signal from the satellite antenna 116.

Memory 270 may also store other data 270, such as various characteristics of the original spot beam signal or other information.

Network connections 278 are configured to communicate with other computing devices, such as channel-switching-network computing device 280. I/O interfaces 274 may include a keyboard, audio interfaces, other video interfaces, or the like to allow an administrator to interact with the spot-beam-replacement computing device 252 (e.g., as discussed herein and in conjunction with the control interface 234 in FIG. 5B). Other computer-readable media 276 may include other types of stationary or removable computer-readable media, such as removable flash drives, external hard drives, or the like.

The channel-switching-network computing device 280 receives the replacement spot beam signal from the spot-beam-replacement computing device 252, and other non-spot-beam orbital signals from satellite antenna 116. In general, the channel-switching-network computing device 280 combines or mixes the replacement spot beam signal with the other orbital signals for distribution to content receivers 130a-130c. One or more special-purpose computing systems may be used to implement the channel-switching-network computing device 280. Accordingly, various embodiments described herein may be implemented in software, hardware, firmware, or in some combination thereof.

The channel-switching-network computing device 280 includes memory 282, one or more central processing units (CPUs) 292, other computer-readable media 296, I/O interfaces 294, and network connections 298.

Memory 282 includes one or more various types of non-volatile and/or volatile storage technologies, such as described above in conjunction with memory 212 in FIG. 5A. Memory 282 may be utilized to store information, including computer-readable instructions that are utilized by CPU 292 to perform actions as described herein.

Memory 282 may have stored thereon channel-switching-network system 284, which includes channel-switching-network module 286. The channel-switching-network module 286 may employ embodiments described herein to mix or combine the replacement spot beam signal with other orbital signals for distribution to content receivers 130a-130c. In some embodiments, channel-switching-network module 286 communicates with the content receivers 130a-130c to receive a channel selection from a respective content receiver, and the channel-switching-network module 286 selects the replacement spot beam signal or another orbital signal with the corresponding channel. In various embodiments, the channel-switching-network module 286 performs the functionality of the digital channel stack switch circuitry 210 in FIG. 5A. Memory 282 may also store other data 290, such as various characteristics of the content receivers 130a-130c or other information.

Network connections 298 are configured to communicate with other computing devices, such as spot-beam-replacement computing device 252. I/O interfaces 294 may include a keyboard, audio interfaces, other video interfaces, or the like. Other computer-readable media 296 may include other types of stationary or removable computer-readable media, such as removable flash drives, external hard drives, or the like.

Although FIGS. 5A and 5B describe example implementations of circuitry and computing systems for implementing embodiments described herein, embodiments are not so limited, and other combinations of circuitry or computer devices or both may be employed to perform the functionality described herein.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising
receiving, from a satellite via a satellite antenna at a user's premises, a spot beam signal that includes information identifying one or more expected local channels;
receiving, from a satellite via the satellite antenna, at least one other orbital signal with program content for one or more other channels;
analyzing the spot beam signal to identify the one or more expected local channels;
receiving, via an over-the-air antenna at the user's premises, at least one over-the-air television signal;
analyzing the at least one over-the-air television signal to determine one or more local channels that are available in the at least one over-the-air television signal;
extracting the one or more available local channels from the at least one over-the-air television signal;
converting the at least one extracted channel into a replacement spot beam signal that is a satellite-compatible signal;
combining the replacement spot beam signal with the at least one other orbital signal; and
providing the combined signal to a content receiver.

2. The method of claim 1, wherein converting the at least one extracted channel into the replacement spot beam signal includes:
transcoding the at least one extracted channel into a video signal compatible with the content receiver;
modulating the transcoded signal based on one or more modulation parameters of the spot beam signal; and
up-converting the modulated signal to a transponder frequency of the spot beam signal.

3. The method of claim 1, wherein converting the at least one extracted channel into the replacement spot beam signal includes:
determining a transponder frequency of the spot beam signal and one or more spot beam modulation parameters; and
employing the transponder frequency and the one or more spot beam modulation parameters to convert the at least one extracted channel into the satellite-compatible signal.

4. The method of claim 1, wherein converting the at least one extracted channel into the replacement spot beam signal includes:
determining a transponder frequency of the spot beam signal and one or more spot beam modulation parameters based on the spot beam signal;
transcoding the at least one extracted channel into a video signal compatible with the content receiver;
modulating the transcoded signal based on the one or more modulation parameters of the spot beam signal; and
up-converting the modulated signal to the transponder frequency of the spot beam signal.

5. The method of claim 1, further comprising:
receiving, at a content distributor that is remote from the user's premises, the at least one over-the-air television signal that includes the one or more available local channels;
transcoding, by the content distributor, the one or more available local channels into a video signal compatible with the content receiver;
generating, by the content distributor, transcoding metadata that defines how the content distributor transcoded the one or more available local channels;
generating, by the content distributor, the spot beam signal to include the transcoding metadata but not the one or more transcoded available local channels; and
wherein converting the at least one extracted channel into the replacement spot beam signal includes:
extracting, by spot-beam-replacement circuitry at the user's premises, the transcoding metadata from the spot beam signal; and
transcoding, by the spot-beam-replacement circuitry, the at least one extracted channel based on the transcoding metadata.

6. The method of claim 1, wherein providing the combined signal to the content receiver includes:
providing the combined signal to each of a plurality of content receivers.

7. The method of claim 1, wherein providing the combined signal to the content receiver includes:
receiving, from a first content receiver, a request for a first channel from the one or more other channels or the one or more available local channels;
providing, to the first content receiver, a first satellite signal from the combined signal that is associated with the first channel;
receiving, from a second content receiver, a request for a second channel from the one or more other channels or the one or more available local channels; and
providing, to the second content receiver, a second satellite signal from the combined signal that is associated with the second channel.

8. The method of claim 1, further comprising:
ignoring program content for the one or more expected local channels included in the spot beam signal.

9. The method of claim 1, wherein the spot beam signal does not include program content for the one or more expected local channels.

10. A computing device, comprising
a memory that stores computer instructions; and
a processor that executes the computer instructions to:
obtain, from a spot beam signal received via a satellite antenna at a
location associated with a plurality of content receivers, information identifying local channels without obtaining program content for the local channels via the spot beam signal;
determine a transponder frequency of the spot beam signal and one or more spot beam modulation parameters;
receive, via an over-the-air antenna at the location associated with the plurality of content receivers, at least one over-the-air television signal;
extract at least one channel from the at least one over-the-air television signal;

transcode the at least one extracted channel into a video signal compatible with the plurality of content receivers;
modulate the transcoded signal based on the one or more spot beam modulation parameters;
up-convert the modulated signal to the transponder frequency of the spot beam signal; and
output the up-converted signal to be combined with at least one other orbital signal for transmission to the plurality of content receivers.

11. The computing device of claim 10, wherein the processor executes further computer instructions to:
analyze the spot beam signal to identify the local channels expected to be in the at least one over-the-air television signal;
analyze the at least one over-the-air television signal to determine one or more local channels that are available in the at least one over-the-air television signal; and
select the at least one channel to be extracted from the at least one over-the-air television signal from the one or more local channels that are available in the at least one over-the-air television signal based on the information in the spot beam signal identifying the local channels.

12. The computing device of claim 10, wherein the processor executes further computer instructions to:
select the at least one channel from a plurality of local channels that are available in the at least one over-the-air television signal based on the information in the spot beam signal identifying the local channels.

13. The computing device of claim 10, wherein the processor executes further computer instructions to:
receive, via the satellite antenna, the at least one other orbital signal; and
combine the up-converted signal with the at least one other orbital signal for transmission to the plurality of content receivers.

14. A system, comprising:
a satellite antenna that receives satellite television signals including a spot beam signal and at least one other orbital signal;
an over-the-air antenna that receives over-the-air television signals; and
spot-beam-replacement circuitry that receives the spot beam signal and the over-the-air television signals and performs actions, the actions including:
determining at least one spot beam characteristic associated with the spot beam signal; and
converting, based on the at least one spot beam characteristic, the over-the-air television signals into a replacement spot beam that is a satellite-compliant signal; and
outputting the replacement spot beam signal to be combined with the at least one other orbital signal.

15. The system of claim 14, wherein the spot-beam-replacement circuitry performs further actions, including:
determining a transponder frequency of the spot beam signal and one or more spot beam modulation parameters of the spot beam signal; and
converting the over-the-air television signals into the replacement spot beam by transcoding the over-the-air television signals into a video signal compatible with at least one content receiver, modulating the transcoded signal based on the one or more spot beam modulation parameters, and up-converting the modulated signal to the transponder frequency of the spot beam signal.

16. The system of claim 14, wherein the spot-beam-replacement circuitry performs further actions, including:
analyzing the spot beam signal to determine the at least one spot beam characteristic.

17. The system of claim 14, wherein the spot-beam-replacement circuitry receives the at least one other orbital signal and performs further actions, including:
combining the replacement spot beam with the at least one other orbital signal; and
outputting the combined signal to the at least one content receiver.

18. The system of claim 14, wherein the spot-beam-replacement circuitry performs further actions, including:
analyzing the spot beam signal to identify at least one expected local channel in the over-the-air television signals;
extracting at least one channel from the over-the-air television signals based on the at least one identified expected local channel; and
converting the at least one extracted channel into the replacement spot beam.

19. The system of claim 14, further comprising:
channel-switching-network circuitry that combines the replacement spot beam with the at least one other orbital signal for distribution to at least one content receiver.

20. The system of claim 14, wherein the channel-switching-network circuitry performs further actions, including:
receiving, from a first content receiver of the at least one content receiver, a first request for a first channel in the over-the-air television signals;
in response to receipt of the first request from the first content receiver, providing the replacement spot beam signal to the first content receiver;
receiving, from a second content receiver of the at least one content receiver, a second request for a second channel in the at least one other orbital signal; and
in response to receipt of the second request from the second content receiver, providing a satellite signal from the at least one other orbital signal that is associated with the second channel to the second content receiver.

* * * * *